United States Patent [19]

Salsman

[11] Patent Number: 5,089,805
[45] Date of Patent: Feb. 18, 1992

[54] BRAKE LIGHT SYSTEM TO INDICATE INTENSITY OF SLOW DOWN

[76] Inventor: Robert K. Salsman, 1296 Carmen Ct., Conyers, Ga. 30208

[21] Appl. No.: 519,801

[22] Filed: May 7, 1990

[51] Int. Cl.⁵ .............................................. B60Q 1/50
[52] U.S. Cl. ..................................... 340/467; 340/464; 340/478; 340/479; 200/61.45 R
[58] Field of Search ............... 340/467, 464, 478, 479; 200/61.45 R, 61.45 M

[56] References Cited

U.S. PATENT DOCUMENTS

| | | | |
|---|---|---|---|
| 2,982,944 | 5/1961 | Weller | 340/467 |
| 4,107,647 | 8/1978 | Yoshino | 304/467 |
| 4,556,862 | 12/1985 | Meinershagen | 340/478 |
| 4,651,129 | 3/1987 | Wood et al. | 340/467 |
| 4,667,177 | 5/1987 | Athalye | 340/479 |
| 4,712,044 | 12/1987 | Phillips | 340/478 |
| 4,920,330 | 4/1990 | Plozner | 340/464 |

Primary Examiner—Donnie L. Crosland
Attorney, Agent, or Firm—Cort Flint

[57] ABSTRACT

A vehicle deceleration indicator device which operates with the braking system of the vehicle. The device includes an array of lights (A), inertia switch apparatus (32, 34, 36, 38) and interconnecting circuitry. The switch apparatus are mounted on a swingable arm (24) which at all times remains at true vertical. Arm brake apparatus (D) are actuated when the vehicle is braked to secure the arm at true vertical and inertia acts against the switch apparatus to sequentially activate the lights (54, 56, 58, 60, 62) of the array.

20 Claims, 3 Drawing Sheets

BRAKE LIGHT SYSTEM TO INDICATE INTENSITY OF SLOW DOWN

BACKGROUND OF THE INVENTION

The present invention is concerned with inertia controlled deceleration indicating systems for vehicles. It is envisioned that these systems could be employed on motor vehicles as original equipment or as add-on equipment.

As part of the effort to reduce automobile accidents, there has been an increasing emphasis on enhancing the visibility of brake lighting. Brake lights have become larger and more numerous, including the advent of the high mount brake light system which is mounted on the shelf under the rear window or on the trunk. However, the current state of automobile brake lighting has typically provided for only a single intensity, that is, the brake lights are either on or off. In many instances, safety would be enhanced if a driver approaching from the rear could determine at what rate the forward automobile is braking or has braked.

U.S. Pat. No. 3,501,742 discloses a brake light having a plurality of lamps with different intensities. The low intensity lamps are energized when the brakes are first applied, and the high intensity lamps are energized by an inertial switch when a larger braking force is applied. U.S. Pat. No. 3,157,854 discloses a vehicle brake light which has variable intensity depending upon the rate of deceleration. However, these devices do not compensate for the vehicle being on an incline such as when ascending or descending on a grade. U.S. Pat. No. 3,955,398 discloses a deceleration switch mounted on a pivot for manually adjusting the angle at which the switch is actuated to set the limits of deceleration. U.S. Pat. No. 2,307,441 discloses a vehicle signal device wherein a deceleration switch is pivotally mounted to compensate, or avoid, aberrations due to the tilting of the vehicle. However, the latter two devices are not entirely suitable for use in the brake light system of an automobile to provide variable intensity brake lighting and compensate for incline vehicle travel.

Accordingly an object of the invention is to provide a deceleration indicating means which includes an array of lights which are activated with varying intensity depending on the rate of braking while effectively compensating for the inclination of the vehicle.

Another object of the invention is to provide a deceleration indicating means which includes an array of lights which are activated from the center outwardly equally on both sides of the array in response to vehicle braking intensity.

Another object of the invention is to provide a switching apparatus which includes a switch mounting member always maintained at true vertical while the vehicle is in motion and locked in that position upon actuation of vehicle braking.

Another object of the invention is a switching device which operates to react directly in response to an increase in braking inertia.

SUMMARY OF THE INVENTION

The above objectives are accomplished according to the above invention by providing a deceleration indicating device for a vehicle having brakes. The indicating device includes a light array which has a plurality of lights carried by a mount. The array of lights are mounted to an associated automobile structure. An inertia activated switch is mounted to a stationary portion of the vehicle. The switch includes an arm pivotally mounted at a first end so as to cause its longitudinal axis to be maintained at true vertical. A plurality of inertia activated switch elements are arranged substantially coextensive with the longitudinal axis of the arm and arm latch carried by the arm. The circuits interconnecting the vehicle brakes, the light array, the switch elements, and the arm latch so that upon activation of the vehicle brakes, the arm latch is activated to maintain the arm positioned at true vertical against an inertial force. The inertial force acts upon the switch elements so as to sequentially activate the array of lights and provide variable intensity brake lighting depending on the inertial force. The array of lights are arranged along a longitudinal axis and comprise high mount vehicle brake lights. A housing is provided for the switch. The housing includes a latch surface for co-operation with the arm latch. The latch surface includes an arcuate shaped metallic strip arranged to extend along a path of relative motion between the housing and a second end of the arm in a position to be engaged by the latch including electro-magnetic brakes carried by the arm which latches the arm to the latching surface when activated. The housing includes pivotally mounting the arm. Damping devices are arranged on the pivot so as to limit unrestricted pivotal movement of the arm. The switch elements comprise mercury switches having tubes of uniform inner diameter and configuration so as to allow smooth or uniform movement of a small mass of mercury therein. The mercury switch tubes are arranged so that the longitudinal axes thereof are positioned at progressively increasing angles relative to the longitudinal axis of the arm. The arm latch is electro-magnetic. An even number of lights in the light array is included, and each switch element is connected to two lights each equally spaced from the center of the array. The circuits connect with the switch elements and with the lights so that the two lights adjacent the center of the light array are first activated in response to vehicle braking. The remaining lights are activated in pairs sequentially outward from the center in direct response to the inertial force created by vehicle braking.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

Figure 1:
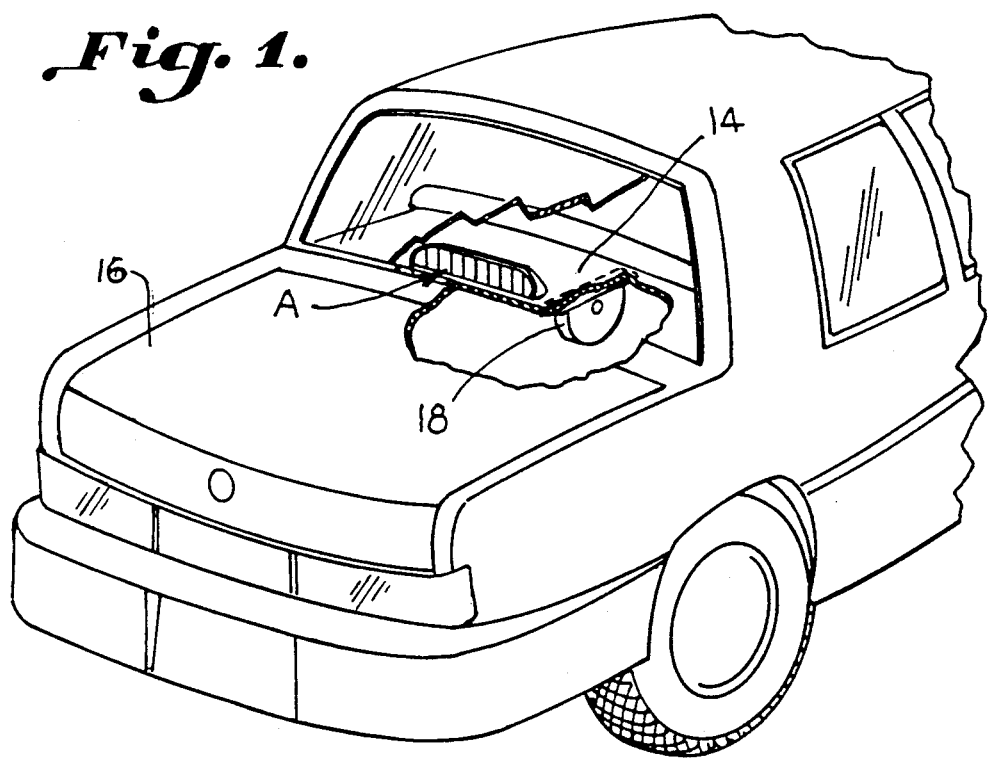
FIG. 1 is a perspective view of the rear portion of a vehicle showing one embodiment of the deceleration indicator device.
Figure 2:
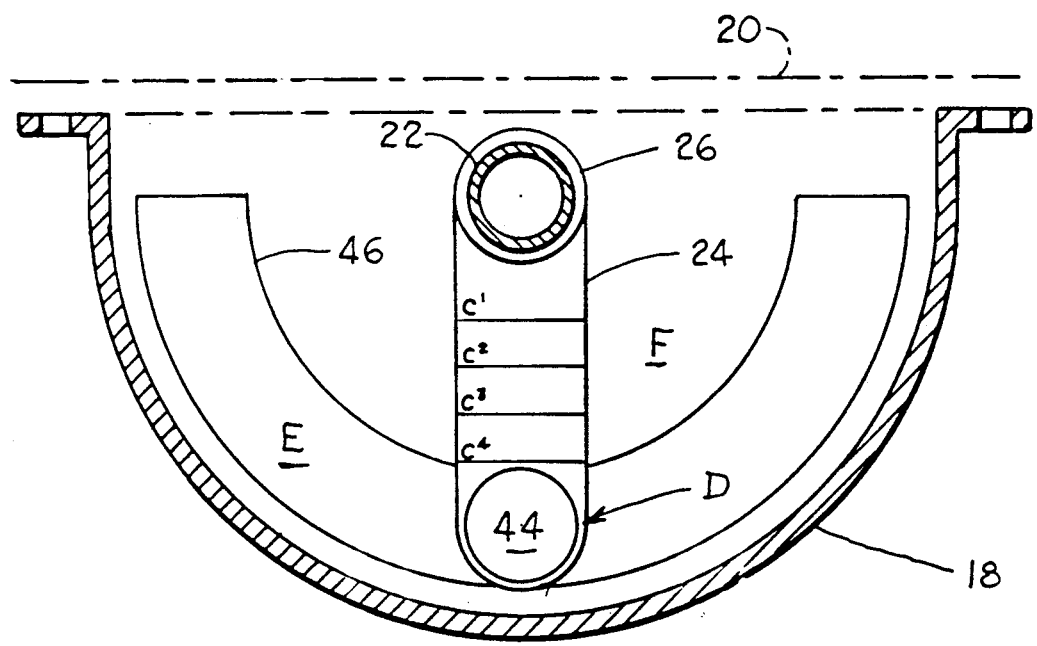
FIG. 2 is a schematic view of the housing at the horizontal and switch mounting arm at true vertical and perpendicular to the mounting surface of the housing.
Figure 3:
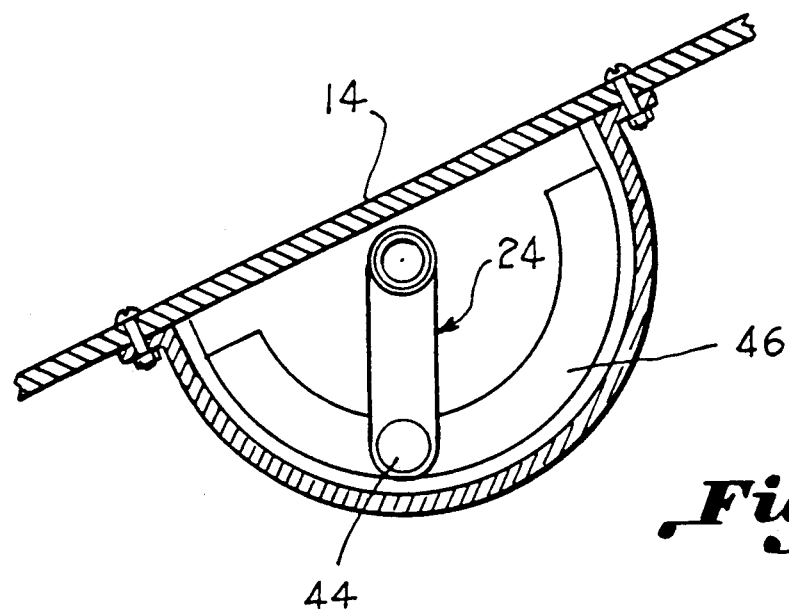
FIG. 3 is a schematic view showing the housing at an incline with the arm at true vertical.

Referring now to the drawings in greater detail, FIG. 1 shows the rear portion of a motor vehicle having the usual brake lights and including a light array A mounted as the high mount brake lights on the rear deck 14 of the vehicle. Inside the trunk 16 and beneath deck 14 is mounted switch housing 18. Housing 18 is arranged so that mounting portion 20 is horizontal with the road surface. As can best be seen in FIGS. 2 and 4, housing 18 is provided with a hollow shaft 22 which traverses the housing and provides an axis about which a pivot arm 24 is pivotally mounted. Pivot arm 24 is provided at its upper end with an opening which receives shaft 22 and allows arm 24 to extend always at true vertical. FIG. 3 shows housing 18 at an incline with arm 24 maintaining true vertical. Housing 18 must accommodate arm 24 through an arcuate motion of 90° however, it is preferred that a motion of 180° be accommodatable. Housing 18 and pivot arm 24 provide a carrier means for inertial switch means which will be more fully described later.

Shaft 22 has a bushing or damping means 26 mounted thereon which functions to restrict slightly the free pivoting motion of arm 24. This is necessary to eliminate a continuous swaying movement which would otherwise be transmitted to the arm by movement of the vehicle. It is noted that damping means 26 do not prevent arm 24 from always assuming the position of true vertical. Pivot arm 24 mounts coextensive with its longitudinal axis, inertial switch means in the form of an array of mercury switches 28. The tubes of the mercury switches are mounted at varying angles relative to lines 30 which extend transverse to the longitudinal axis of arm 24. It is preferred that the tube of mercury switch 32 be arranged at between 1° and 5° relative to line 30, the tube of mercury switch 34 be arranged between 8° and 12° relative to line 30, the tube of mercury switch 36 may be arranged between 15° and 18° relative to line 30 and the tube of mercury switch 38 may be arranged between 21° and 23° relative to line 30. Should more mercury switches be desired, they would be arranged within an angular range which progresses as indicated above. It is desirable that the inner diameter of the mercury switch tubes be of a uniform diameter and configuration so as to allow uniform movement of the mercury mass therein. Each mercury switch tube is provided with a pair of contacts 40 arranged at the elevated end of the tubes. Each tube also contains a small mass of mercury 42, which activates the mercury switch when it is moved to a position to bridge the contacts 40.

A highly effective inertial switching means is provided according to the invention. Arm 2 of the inertial switching means pivots around an axis so that gravity always keeps the switches in line with an axis substantially perpendicular to gravity in a prescribed sensing position for braking. Once the brakes are applied, power goes to an electro-magnet which prevents the pivoting of the switches, and if braking continues to occur, the mercury switches operate by the mercury moving forward due to inertial forces touching contact points which close the circuit to progressively activate the lights. While mercury switches are disclosed, other types of switches may be utilized. For example, reed switches can be used. When the brakes are applied, the power locks the otherwise freely swinging switch array, and the braking force may throw a magnet forward which activates the reed switch array. The harder the brakes are applied, the faster the vehicle stops and the further the magnet swings, closing more lead switches activating more lights in the array outwardly. The main consideration is that the switching array must swing freely to compensate for an inclined attitude in travel until the latch switch locks the switching array and allows the activated inertial switch to function. The first switch in the inertial switching array should work at any braking action, and so should be very low. The last inertial switch should work only when the vehicle is in a rapid braking situation. The last inertial switch should be disposed at an angle no greater than 30° as angles above this will not work even under the most rapid braking situation.

Figure 4:
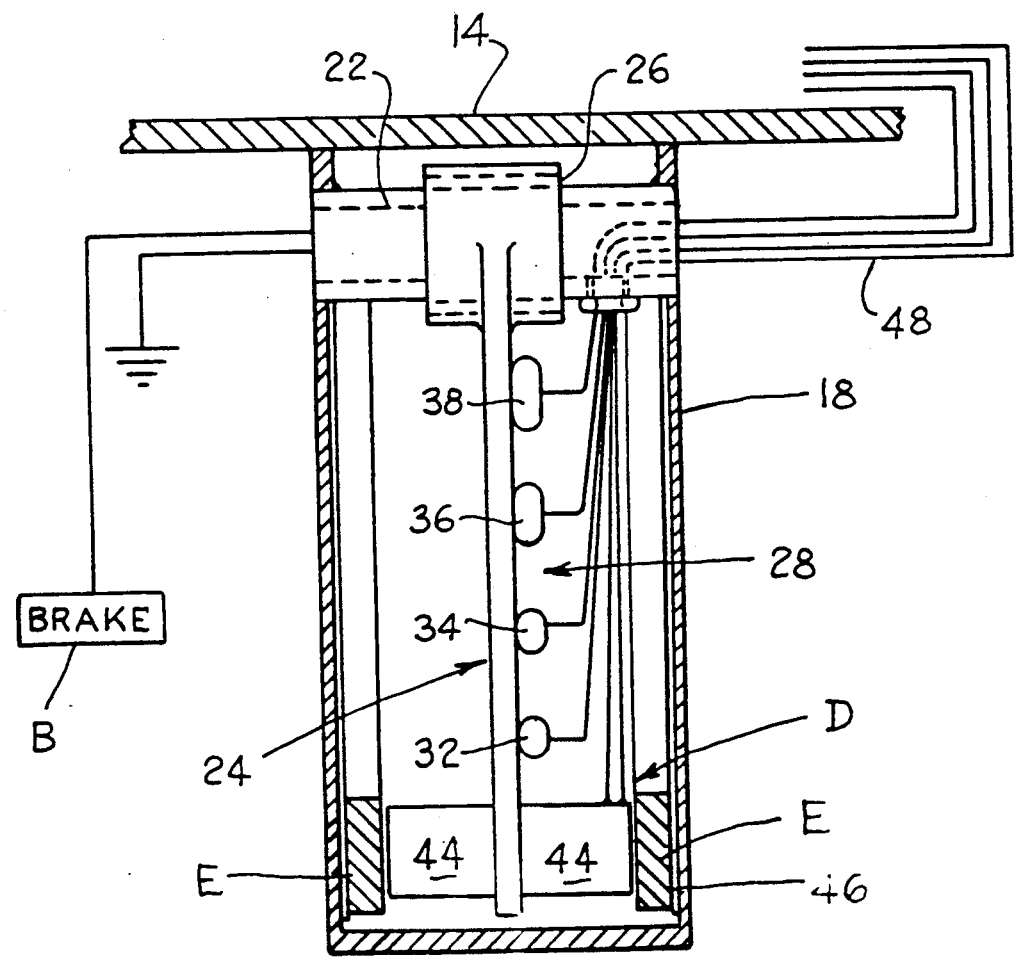
FIG. 4 is a sectional view of FIG. 3.
Figure 5:
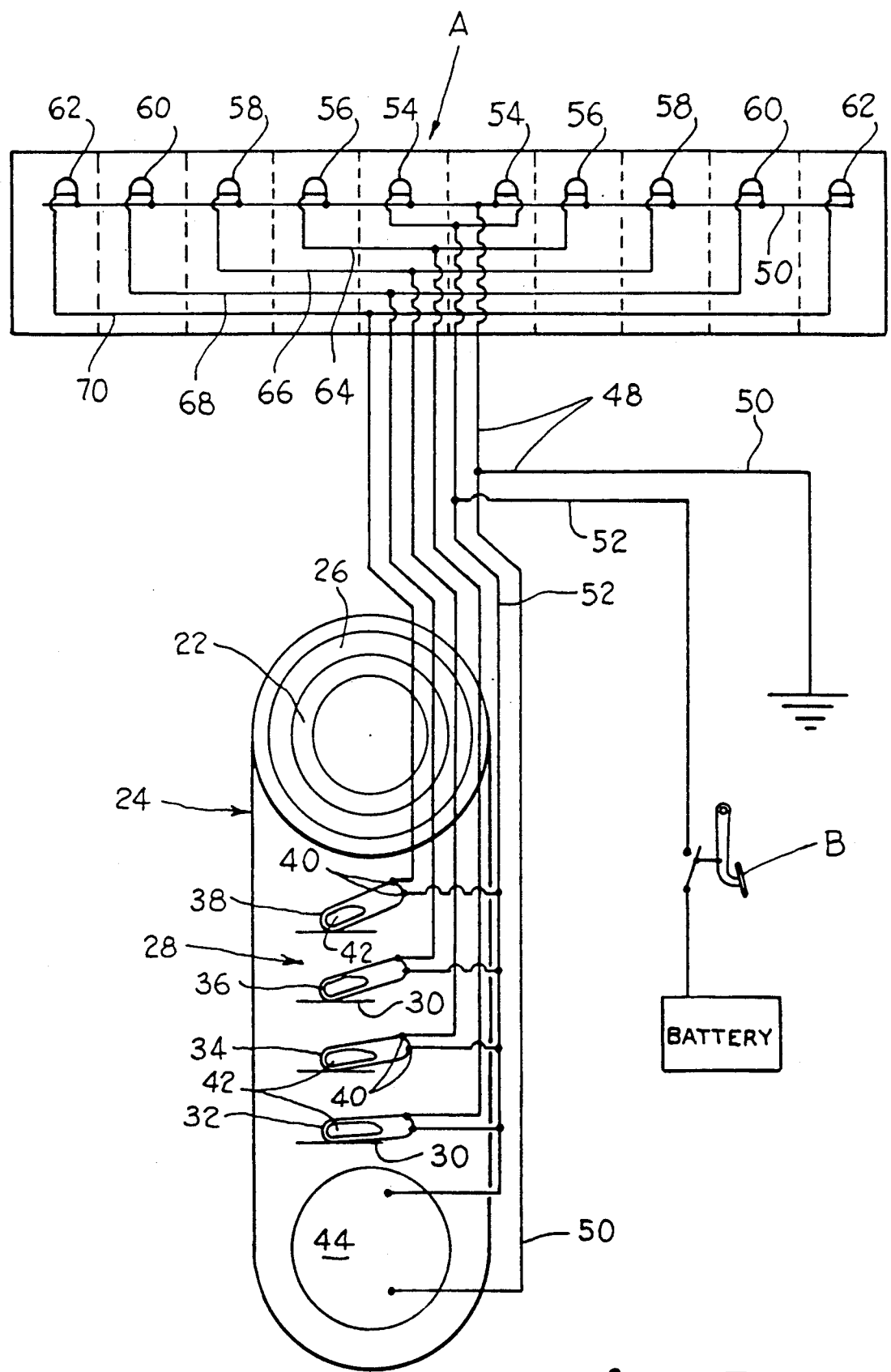
FIG. 5 is a schematic view of the switch arm, light array and interconnecting circuitry.

The lower end of arm 24 is provided with a latch means D in the form of an electro-magnetic brake which operates to lock arm 24 in the position at which it is extending relative to housing 18 during braking of the vehicle. Normally housing 18 is made of plastic and is provided at a position opposite the arcuate path of electro-magnetic brake 44 with an arcuately shaped metal braking surface 46 as seen in FIGS. 2 and 4. It is not essential that electro-magnetic brake 44 be mounted at the end of arm 24 as shown in the drawings. The electro-magnetic brake could alternatively be located at any point along arm 24 to include being co-extensive with its pivot point. Also, it is not necessary that electro-magnetic brake means 44 contact both sides of housing 18; in some instances, contact with only one side is sufficient. Housing 18 could be made of entirely metal, thus eliminating the use for the brake or latch surface 46. It is not critical where mercury switch array 28 is mounted on arm 24. FIG. 5 shows array 28 mounted on a side of arm 24. Switch array 28 could equally well be mounted on the front or rear wall of the arm. The important feature is the angular position of the mercury switches relative to the longitudinal axis of arm 24. The arrangement of FIG. 3 could comprise a unitary member formed by injection molding of plastic.

Mercury switches 32, 34, 36 and 38 and electro-magnetic brake means 44, as shown in FIGS. 4 and 5, are connected through circuitry generally indicated at 48 with the lights of the array A, with ground and with the vehicle brake switch or wire. It should be noted that the wiring arrangement shown in FIG. 4 is only schematic and is not intended to be a limiting wiring arrangement employed with the device. For example, electrical slip rings could be arranged on shaft 22 or within damping means 26 and contact made with ribbon wire. It is simply necessary that the wiring not limit movement of arm 24. It can be seen that the vehicle brake switch-ground leads 50 is connected with the electro-magnetic brake and with each of the lights of array A. Positive lead 52, from the vehicle brake wire or switch is connected with electro-magnetic brake 44 and with lights 54 of array A so that actuation of the vehicle brake electro-magnetic brake 44 and lights 54 are immediately actuated. It is noted that lights 54 are arranged on opposite sides of said center point of array A and are equally spaced from that point. Lights 56–62 are also arranged one on each side of the said center point. Positive lead 52 is also connected to each of the mercury switches 32, 34, 36, and 38 and through contact points 40 with lights 56–62. Mercury switch 32 is arranged to control lights 56 via lead 64, mercury switch 34 is arranged to control lights 58 via lead 66, mercury switch 36 is arranged to control lights 60 via lead 68, and mercury switch 38 is arranged to control lights 62 via lead 70.

In operation, upon the application of the vehicle brake means B, electro-magnetic brake 44 and lights 54 of array A are immediately activated and will remain so until the cessation of the vehicle braking action. Magnetic brake 44 engages with braking member 46 and locks arm 24 in the true vertical position at which it extends. Inertia applies a forward force against arm 24 and the array of mercury switches 28. As braking intensity increases, mercury mass 42 within the tubes of mercury switches 32-38 is forced forward against the angle of inclination of the tubes. Mercury switch 32 with the smallest angle or inclination is first activated as mass 42 bridges contacts 40. Depending upon the intensity of the braking action, switches 34, 36, and 38 are sequentially activated thereafter causing lights 56-62 of the array to be activated in sequence. In this manner a vehicle following closely can be quickly alerted to the intensity of the braking of the lead vehicle.

Preferably, the wiring of the switch elements exits through the pivot journal of housing 18 to prevent excessive strain on the wiring. By making the electromagnet part of the pivot arm 24, all the circuitry can be placed together and the wiring routed through the pivot. By making the mercury switches very uniform, a uniform flow of mercury occurs within the tube of the switch so that surface tension is uniform and reliable operation is obtained. Since the mercury is heavy, the mercury switches are disposed on the pivoting arm so that at rest, the directional force of gravity on the mercury is in substantially a direct line to the perpendicular to gravity.

While a preferred embodiment of the invention has been described using specific terms, such description is for illustrative purposes only, and it is to be understood that changes and variations may be made without departing from the spirit or scope of the following claims.

What is claimed is:

1. A deceleration indicating device for a vehicle having braking means, said indicating device including;
   a light array having a plurality of lights carried by a mounting means;
   said mounting means mounting said array of lights to an associated automobile structure;
   an inertia activated switch mounted to a stationary portion of the vehicle, said switch including an arm pivotally mounted at a first end which causes its longitudinal axis to be maintained at true vertical, a plurality of inertia activated individual switch elements arranged substantially coextensive with the longitudinal axis of said arm, and arm latch means carried by said arm;
   circuit means interconnecting said vehicle brake means, said light array, said switch elements, and said arm latch means so that upon activation of said vehicle brake means, said arm latch means is activated to maintain said arm positioned at true vertical against an inertial force;
   whereby said inertial force acts upon said individual switch elements so as to sequentially activate the lights of said array to provide variable intensity brake lighting depending on the intensity of said inertial force.

2. The arrangement according to claim 1, wherein the array of lights are arranged along a longitudinal axis and comprise high mount vehicle brake lights.

3. The arrangement according to claim 1, wherein a housing is provided for said switch means, said housing including a latch surface for co-operation with said arm latch means.

4. The arrangement of claim 3, wherein said latch surface includes an arcuate shaped metallic strip arranged to extend along a path of relative motion between the housing and a second end of said arm in a position to be engaged by said latch means includes an electro-magnetic brake means carried near said second end of said arm which latches said arm to said latching surface when activated.

5. The arrangement according to claim 3, wherein said housing includes pivot means pivotally mounting said arm.

6. The arrangement according to claim 5 wherein damping means are arranged on said pivot means so as to limit unrestricted pivotal movement of said arm.

7. The arrangement according to claim 1, wherein said switch elements comprise mercury switches having tubes of uniform inner diameter and configuration so as to allow smooth or uniform movement of a small mass of mercury therein.

8. The arrangement according to claim 7, wherein said mercury switch tubes are arranged so that the longitudinal axes thereof are positioned at progressively increasing angles relative to said longitudinal axis of said arm.

9. The arrangement according to claim 1 wherein said arm latch means is electro-magnetic.

10. The arrangement according to claim 1, including an even number of lights in said light array, and each said switch element is connected to two lights each equally spaced from the center of the array.

11. The arrangement of claim 10 wherein said circuit means connects with said switch elements and with said lights so that the first two lights adjacent the center of said light array are first activated in response to vehicle braking, the remaining lights are activated in pairs sequentially outward from said center in direct response to said inertial force created by said vehicle braking.

12. A vehicle deceleration indicating device for attachment to a vehicle having braking means, said indicator including;
   a light array having a plurality of lights carried by a mounting means;
   an inertial activated switch means including a stationary carrier means mounted to a stationary portion of said vehicle, a pivotal arm pivotally mounted at a first end to said carrier means and arranged so that its longitudinal axis always extends at true vertical regardless of the angular disposition of said vehicle;
   a plurality of mercury switch tubes of uniform size and shape superimposed on said pivotal arm spaced along said longitudinal axis, said tubes are arranged at progressively increasing angles relative to said longitudinal axis; and
   latch means arranged on said arm;
   circuit means interconnecting said light array, said switch means, said arm latch means and said vehicle brake means so that upon activation of said vehicle brake means, the arm latch means is activated to temporarily fix said pivotal arm at true vertical against inertial;
   whereby said mercury switches are progressively activated in response to said inertial force and the lights of the array are progressively activated in sequence with said mercury switches.

13. The arrangement according to claim 12 wherein said latch means is arranged at substantially a second end of said pivotal arm.

14. The arrangement according to claim 12 wherein said light array is mounted on a rear deck of the vehicle adjacent a rear window.

15. The arrangement according to claim 12 wherein said carrier means is mounted beneath a rear deck of the vehicle.

16. The arrangement according to claim 12 including at least four mercury switch tubes superimposed along said longitudinal axis of said arm, the tube of the switch furthermost from said pivotal axis of said arm having its longitudinal axis arranged at an angle between 1° and 5° to a line extending perpendicularly from said longitudinal axis of said arm, each succeeding switch tube being positioned at an increased angular range.

17. In an automobile having braking means for detecting deceleration of the automobile, a deceleration indicating device comprising:

a light array having a plurality of lights;
mounting means for mounting said light array on said vehicle;
inertial switch means for progressively sensing said deceleration of said automobile;
stationary carrier means affixed to said automobile, said carrier means including means mounting said inertial switch means in a freely movable manner to compensate for an inclined attitude of said automobile;
latch means for locking said carrier means so that said inertial switch means is maintained in a prescribed sensing position in response to a prescribed braking force; and
circuit means interconnecting said automobile braking means, said light array, said inertial switch means, and said latch means so that upon activation of said automobile braking means, said latch means is activated to maintain said inertial switch means in said prescribed sensing position against inertial force;
whereby said inertial force acts upon said inertial switch means so as to progressively activate said lights of said light array and provide variable intensity brake lighting depending upon said inertial force caused by braking.

18. The apparatus of claim 17 wherein said inertial switch means comprises a plurality of individual switch elements having an actuation axis, said prescribed sensing position corresponding to a vertical axis, and said actuation axis of said switch elements being disposed at different angles to said vertical axis.

19. The apparatus of claim 18 wherein said angular disposition of said actuation axis is between 5° and 30°.

20. The apparatus of claim 17 wherein said light array includes an array of substantially horizontal lights having an innermost pair of lights, an outermost pair of lights, and a plurality of lights disposed between said innermost and outermost lights, and said innermost lights being illuminated upon initial actuation of said braking means, and said outermost lights being actuation upon generally full actuation of said braking means, and said intermediate lights being variably illuminated depending on the braking force between said initial and full braking actuation.

* * * * *